(12) United States Patent
Wetzel et al.

(10) Patent No.: US 7,757,430 B2
(45) Date of Patent: Jul. 20, 2010

(54) REARMING ELECTRONIC ANIMAL TRAP WITH INFRARED SENSOR AND MULTIPLE-KILLING-PLATE CONFIGURATION

(75) Inventors: Troy A. Wetzel, Mohnton, PA (US); Robert T. Cruz, Lititz, PA (US); Richard L. Eyer, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 211 days.

(21) Appl. No.: 12/003,897

(22) Filed: Jan. 3, 2008

(65) Prior Publication Data

US 2009/0172995 A1   Jul. 9, 2009

(51) Int. Cl.
*A01M 19/00* (2006.01)
(52) U.S. Cl. .................................. 43/98; 43/99; 43/112
(58) Field of Classification Search ...................... 43/98, 43/99, 112
See application file for complete search history.

(56) References Cited

U.S. PATENT DOCUMENTS

| | | | | |
|---|---|---|---|---|
| 909,814 A | * | 1/1909 | Norris | 43/98 |
| 2,595,130 A | * | 4/1952 | Edwards | 43/77 |
| 3,197,916 A | * | 8/1965 | Cole, Jr. et al. | 43/66 |
| 5,185,953 A | * | 2/1993 | Gross | 43/58 |
| 5,269,091 A | * | 12/1993 | Johnson et al. | 43/98 |
| 5,949,636 A | * | 9/1999 | Johnson et al. | 361/232 |
| 6,609,328 B2 | * | 8/2003 | Swift et al. | 43/98 |
| 6,775,947 B2 | * | 8/2004 | Anderson et al. | 43/98 |
| 6,836,999 B2 | * | 1/2005 | Rich et al. | 43/98 |
| 7,010,882 B2 | * | 3/2006 | Rich et al. | 43/98 |
| 7,219,466 B2 | * | 5/2007 | Rich et al. | 43/98 |
| 2006/0123693 A1 | | 6/2006 | Muller et al. | |
| 2007/0209270 A1 | | 9/2007 | Rich et al. | |

* cited by examiner

*Primary Examiner*—Christopher P Ellis
(74) *Attorney, Agent, or Firm*—Jacobson Holman PLLC (57) ABSTRACT

An electric or electronic animal trap with a CPU-controlled, rearming, multiple killing plate configuration and automatically resetting interruptible beam sensor for triggering a high voltage cycle. A high-voltage output circuit is connected to killing plates which are activated with a high-voltage pulse train when a pest interrupts the beam signal, such as an infrared beam signal generated by an infrared transmitter to an infrared receiver. The trap is preferably configured to automatically rearm if the IR beam signal is no longer interrupted after the killing cycle. If the IR beam signal is still blocked after the killing cycle, however, the trap enters a standby mode indicating trap servicing is required to remove the dead rodent from the trap.

13 Claims, 5 Drawing Sheets

REARMING ELECTRONIC ANIMAL TRAP WITH INFRARED SENSOR AND MULTIPLE-KILLING-PLATE CONFIGURATION

BACKGROUND OF THE INVENTION

1. Field of the Invention

The present invention relates to electric or electronic animal traps, and relates more particularly to an animal trap adapted to catch and electrocute a targeted animal, and also to rearm in the event the continuing presence of the animal is not detected upon completion of a killing cycle.

Although the concepts of the instant invention are equally applicable to traps for animals of any size, devices of this type are primarily utilized in connection with the trapping and killing of rats and the description will, therefore, focus on this application.

2. Description of the Related Art

A number of animal traps have been developed which include structural devices to trap an animal and prevent its escape, along with electric or electronic components which act to kill the trapped animal.

One such device is found in U.S. Pat. No. 6,609,328 ("the '328 patent", which is hereby expressly incorporated herein by reference as if fully set forth in its entirety. The trap disclosed in the '326 patent electrocutes the animal while also providing a visual indicator signaling when the trap has initiated a kill cycle and thereafter requires servicing to remove an electrocuted animal.

Other trap designs that have relied upon electrocution and effectively prevented pest-escape in the prior art are set forth in U.S. Pat. No. 6,735,899 ("the '899 patent"), which is hereby expressly incorporated herein by reference as if fully set forth in its entirety. The electronic traps disclosed in the '899 patent utilize at least two fixed barriers or diverter members that are positioned between the opening of the trap and a pair of spaced charge plates electrically connected to a voltage source. The barriers reduce the risk of escape so that, when the trap enters the standby mode after trap activation through contact of the pest with the pair of plates, the trap is more likely to have been effective in killing and retaining the dead pest.

Even with the structures intended to prevent escape, larger vermin such as rats may not have been killed and may have escaped. As a result, since the standby mode indicates the presence of a dead pest, because it was in fact initiated by a false trigger, wasted effort is expended by exterminator personnel or other users in servicing and resetting a trap which is, in fact, already empty.

Hence, a trap having three killing plates for greater killing power has been developed as described in U.S. Pat. No. 7,219,466 ("the '466 patent"), also assigned to the present assignee. The disclosure of the '466 patent is also hereby expressly incorporated by reference as if fully set forth herein in its entirety. The trap disclosed in the '466 patent application electrocutes the animal by activating a pair of spaced killing plates, with the first plate being electrically coupled to a third plate that is brought to the voltage level of the first plate approximately 1 msec after circuit activation. The killing circuit is activated when a pest of known impedance is sensed across the pair of plates. The use of three plates both increases electrocution capability and decreases the likelihood of pest escape once the trap has been activated.

The trap of the '466 patent also uses the sensing of a known impedance across the pair of plates after the killing cycle to determine whether the pest is still present and, in the absence thereof, automatically rearms itself without requiring human intervention. If a dead rat is present, however, the trap enters the standby mode and provides a visual indicator that trap servicing is required.

Because the '466 patent relies upon detecting impedance across the plates within a range which is representative of a rat, the trap may not detect undesired pests which fall outside this range. Further, if the rat is present but is not in contact with both plates, as when the animal sits up on its haunches to investigate the roof area of the trap, its presence will not be detected. Since detection of a resistance value across the plates is also used after trap activation to determine whether or not to automatically reset, should there be any failure to detect a killed rodent due to the rat's positioning after death, i.e., the rat's body is not in solid contact with one of the plates, the trap would nonetheless reset. This would be undesirable because rats are known to avoid other dead rats so that the trap would be ineffective in capturing a second rat. In addition, the trap could "hide" the dead carcass for an extended period, exposing the surrounding area to the resulting decay and bacteria growth, since the trap would not provide the visual indicator that a dead animal is contained therein and trap service is required.

Therefore, a need exists for a trap that combines an electronic circuit having high voltage to provide killing power effective to terminate rats, with a detection mechanism that is able to detect the presence of any pest. Preferably, the trap will also rearm the trap without human intervention in the event of pest escape.

SUMMARY OF THE INVENTION

In view of the foregoing, it is one object of the present invention to overcome difficulties in prior art traps due to false-positive indications from an electronically-controlled animal trap.

Another object of the present invention is to provide an electronic animal trap having a plurality of killing plates spaced from one another and activated by the target animal's presence interrupting an interruptible beam signal, such as an infrared (IR), motion sensor or photocell beam signal. The trap is capable of automatic rearming whether or not the animal is dispatched.

A further object of the present invention is to provide an electronically-controlled animal trap that is able to detect the absence of an animal and thereafter to rearm itself multiple times without requiring human intervention.

Yet another object of the present invention is to provide an electronically-controlled animal trap having a detection mechanism that generates and senses an interruptible beam signal, i.e., an interruptible beam sensor. The interruptible beam sensor is effective against any incoming pest large enough to interrupt the interruptible beam signal.

A still further object of the present invention is to provide an electronically-controlled animal trap, particularly a rat trap, which will quickly and efficiently electrocute a targeted animal, is simple in construction, inexpensive to manufacture and highly reliable and completely safe in use, with reduced servicing requirements through automatic rearming and interruptible beam sensing.

In accordance with the foregoing objects, the present invention is directed to an electronic animal trap having a housing with a plurality of killing plates spaced from another on the floor of the housing. The trap includes a micro-controller chip with a high voltage circuit for generating and delivering a high-voltage pulse train to the killing plates for an extended killing cycle. The circuit is activated when the body of the rat interrupts an interruptible beam signal transmitted by a beam transmitter on one side of the trap to a beam receiver on the opposite side of the trap to initiate the killing cycle. If, upon conclusion of the killing cycle, the interruptible beam signal remains interrupted, i.e., the beam receiver does not detect the beam signal, the circuit activates a visual indicator to alert a user that the trap contains a dead rodent. If, on the other hand, the interruptible beam signal is detected by the beam receiver, likely meaning the animal has escaped, the circuit automatically rearms itself and no visual indicator is initiated.

As used herein, the term "interruptible beam sensor" means a detection mechanism that generates and senses an interruptible beam signal. The interruptible beam sensor increases the likelihood of rapid and reliable pest detection, both before and after the killing cycle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The combination of elements, arrangement of parts and features of construction that lead to the rearming animal trap with three-killing-plate configuration of the instant invention will be pointed out in more detail hereinafter with respect to the accompanying drawings in which like parts are designated by like reference characters throughout the several views of the drawings.

DETAILED DESCRIPTION OF THE PREFERRED EMBODIMENTS

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
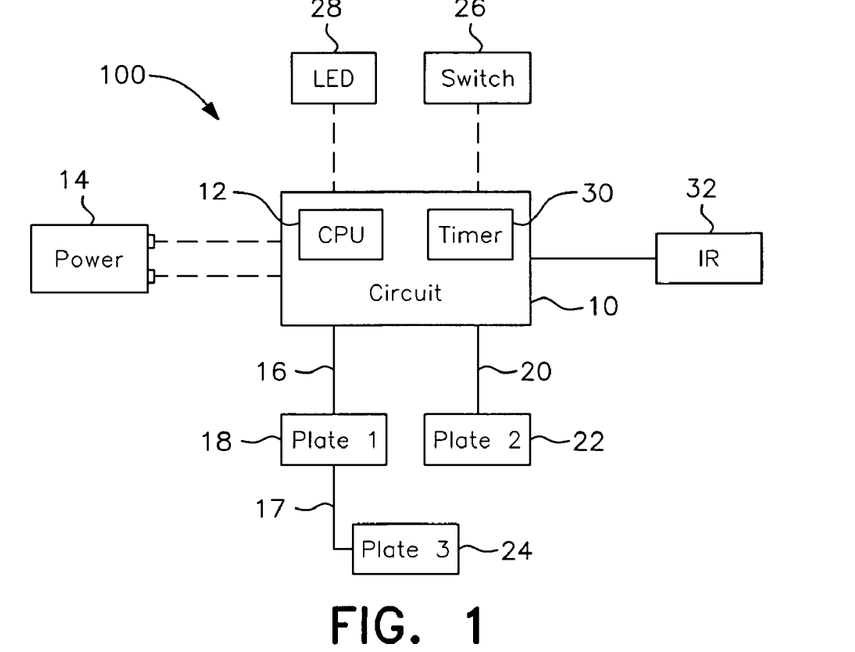
FIG. 1 a block diagram of the high-voltage, rearming circuitry with three-killing-plate configuration and interruptible beam sensor, in the form of an infrared (IR) sensor, according to the present invention.

FIG. 1 is a block diagram of the rearming circuit components, generally designated by the reference numeral 100, according to the present invention. The circuit components 100 include a high-voltage output circuit 10 controlled by a central processing unit (CPU) 12 and electrically connected to a power supply 14. The CPU 12 may be embodied as a standard 8-bit micro controller chip, and the high output circuit 10 can be a standard fly-back circuit.

A first electrical connection member 16, which may be embodied as a wire, receives current from the high-voltage output circuit 10 and also connects to a first killing plate 18 so that electricity can be provided thereto. A second electrical connection member 20, which may also be a wire, connects the high-voltage output circuit 10 to a second killing plate 22. The first and second killing plates 18, 22 are the plates which are activated when the circuit is triggered. According to a preferred embodiment, a third killing plate 24 is coupled to the first plate 18 by a third electrical connection member 17 and automatically goes to the voltage level of the first plate 18 when the circuit is activated. The circuit is turned on to an enabled state by a switch 26 accessible from the exterior of the trap and adjacent an LED 28 which provides the user with visual indicators of trap operating status.

According to a preferred embodiment, the circuit 10 receives input from an IR sensor 32 mounted inside the trap. For ease of discussion hereinafter, the IR sensor embodiment will be referred to but this is understood to be representative only. Any interruptible beam sensor having comparable functional capabilities could be used in place thereof without departing from the intended scope of the present invention. Other examples include, but are not limited to, interruptible photocell beam sensors, motion sensors, reflective sensors, and the like.

The IR sensor includes an IR transmitter 50 and an IR receiver 52 (see FIG. 5) mounted on opposite sides of the trap that transmit and receive an IR beam signal, respectively, from one side of the trap to the other. The circuit is activated to initiate a high voltage killing cycle when the beam signal is interrupted by the body of an incoming rodent. A full schematic representation of the circuit components 100 is provided in FIG. 8 and will be discussed more fully hereinafter.

Before describing the structure and operation of the rearming circuit components 100 of the present invention in detail, a representative trap embodiment within which the circuitry may be incorporated will be explained in order to provide the necessary backdrop for a full understanding of the present invention.

Figure 2:
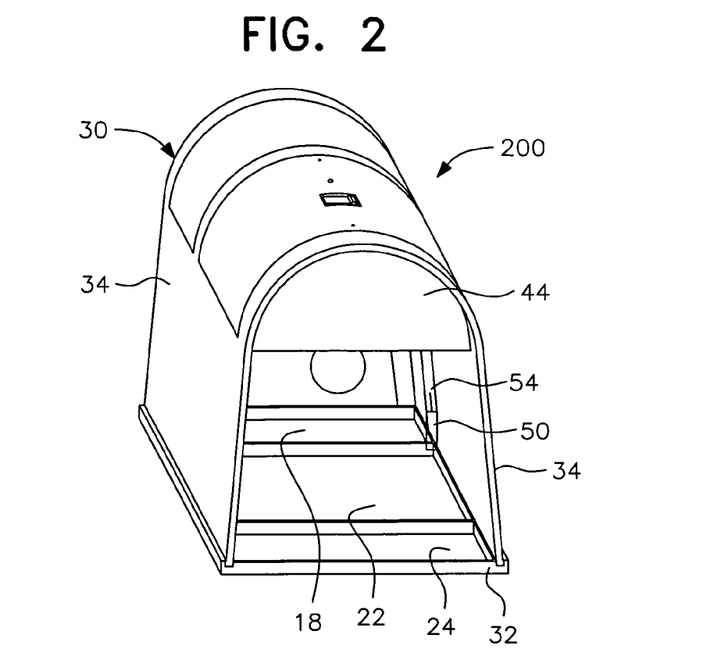
FIG. 2 is a front perspective view of an embodiment of an electronic animal trap that may be used with the high-voltage rearming circuitry of FIG. 1 according to the present invention.
Figure 3:
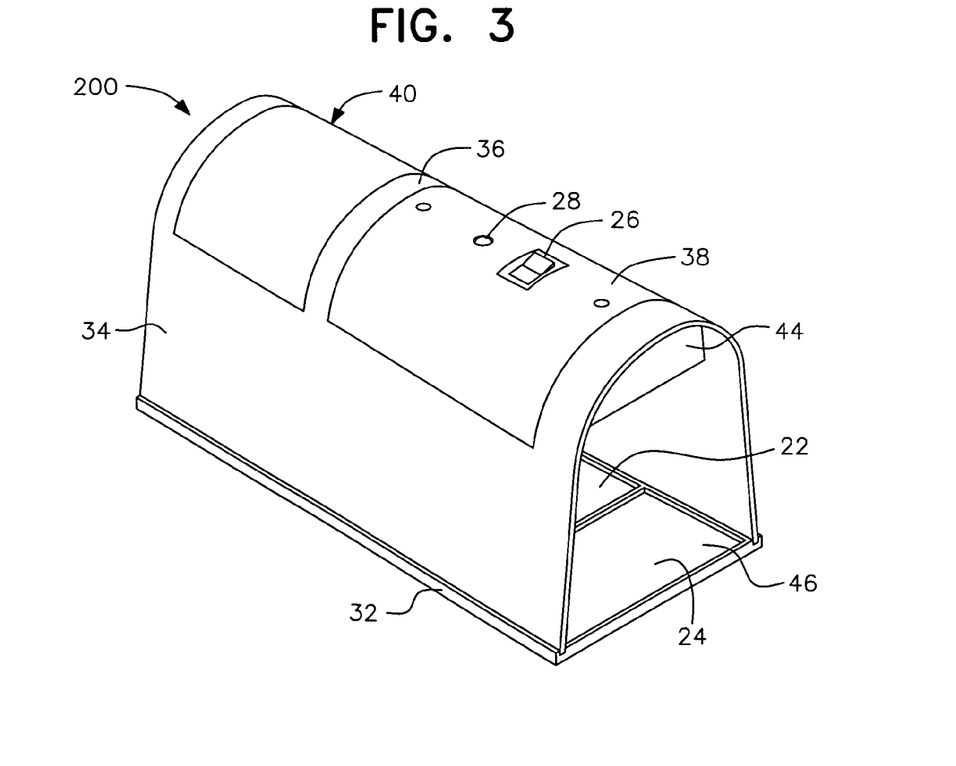
FIG. 3 is another front perspective view of the animal trap embodiment of FIG. 2.

FIGS. 2 and 3 depict two perspective views of an electronic animal trap, generally designated by the reference numeral 200, which is suitable for use with the high-voltage, rearming circuitry of the present invention. Side and end views of the trap are set forth in FIGS. 4 and 5, respectively, and FIG. 6 is a transparent rear perspective view.

As shown, the housing 30 has a bottom wall 32, two upstanding side walls 34, and a roof 36 provided with an electronics chamber 38 and a power supply cover 40. The upper surface of the electronics chamber 38 carries the switch 26 or button that toggles from an "on" or standby position, in which the circuit may be activated, to an "off" or reset position, and the LED 28.

The LED 28 is mounted on the upper surface of the electronics chamber 38 to provide visual indications of the activity and status of the trap. The LED 28 turns "on" or flashes to provide a visual indication to the user during activation of the trap and thereafter when the trap contains a dead rat as will be more fully described hereinafter. Additional LEDs may also be included should separate indicators of differing colors be desired.

The power supply cover 40 covers an area which contains the power supply 14. Of course, the assembly may be simplified by using a single cover portion for the electronics chamber and the power supply. The high-voltage output circuitry of the present invention may also be incorporated within any of the embodiments shown in the '899 patent, and the present application is intended to cover all such embodiments.

With reference to FIGS. 2 and 3, the bottom wall or base 32, side walls 34, back wall 42, front overhang 44, and roof 36 together define an enclosure or killing chamber for the targeted animal. The side walls 34 define the elongated passageway leading toward the back wall 42 from the entrance opening 46 which communicates with the exterior of the housing 30.

The power supply 14 which provides power to the trap preferably includes one or more batteries, such as two AA batteries. Alternatively, the trap may be electrically connected to a wall outlet. When embodied as a battery, the power supply 14 may be conveniently located in the power supply area under the power supply cover 40. The cover 40 is preferably snap fitted for easy entry to replace expired batteries.

In use, the high-voltage output circuit 10 is electrically connected to the power supply 14 to convert the power to electricity. The first electrical connection member 16 receives the electricity from the high-voltage output circuit 10 and also connects to the first plate 18 near the back wall 42 so that electricity can be provided thereto. The second electrical connection member 20 connects to the second plate 22 in the middle of the trap to provide electricity to the second plate 22, while the third plate 24 at the entrance 46 to the trap is coupled to the first plate by the third electrical connection member 17.

As shown, the first, second and third plates 18, 22, 24 are immediately adjacent to one another in spaced relationship, with the first plate adjacent the back of the trap, the third plate adjacent the front of the trap, and the second plate in the middle. While the plates are shown to be of different sizes, plates of the same size or any combination of plate sizes for the three plates is intended to fall within the scope of the present invention.

Figure 4:
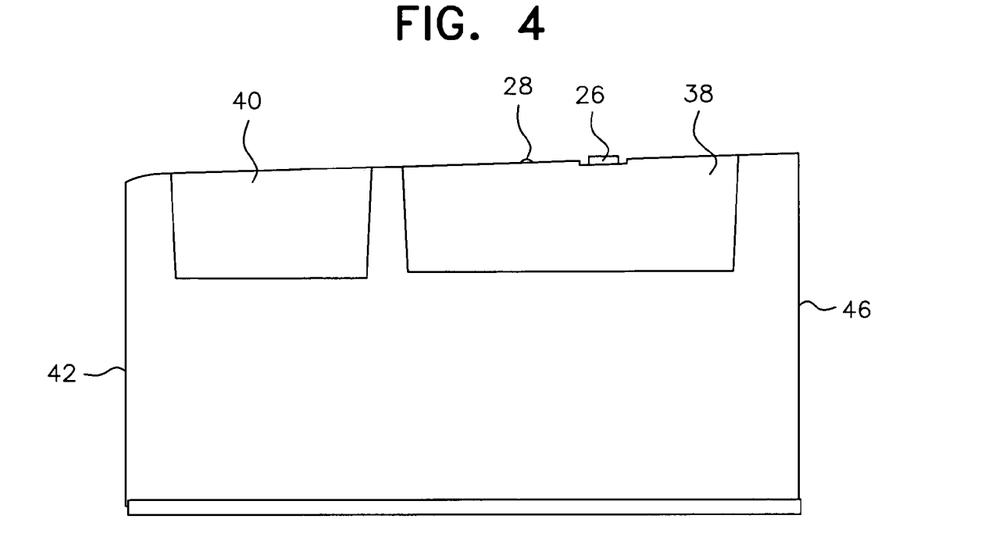
FIG. 4 is a side view of the animal trap embodiment of FIG. 2.

As shown in FIG. 4, the height of the trap preferably decreases gradually from the entrance 46 to the back wall 42. In one preferred embodiment, the trap height begins at approximately 4¹⁹⁄₃₂" and declines to a height of about 4¼". This decreasing height provides a more inviting approach from a rodent's perspective and also reduces the amount of space available for evasive action once inside the trap. The width of the trap may also decrease from the entrance 46 to the back wall 42, again attracting rodents who prefer close spaces while limiting their maneuverability. In one preferred embodiment, the overall length of the trap is approximately 8½" with a width at the base of the entrance 46 of just under 4".

Figure 5:
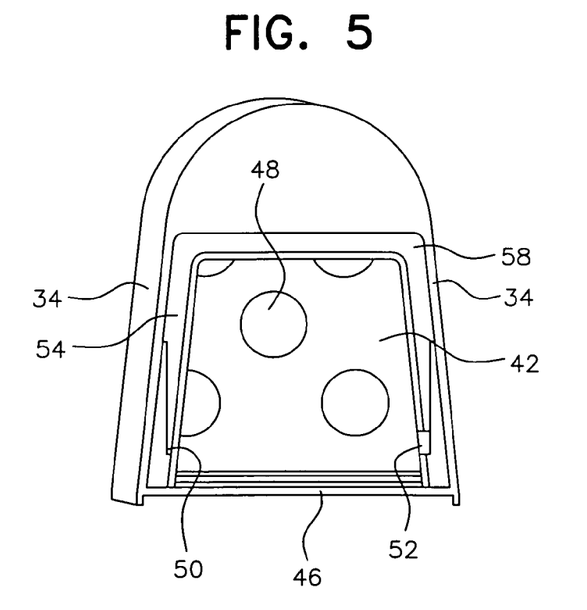
FIG. 5 is a view from the entrance end of the animal trap of FIG. 2.
Figure 6:
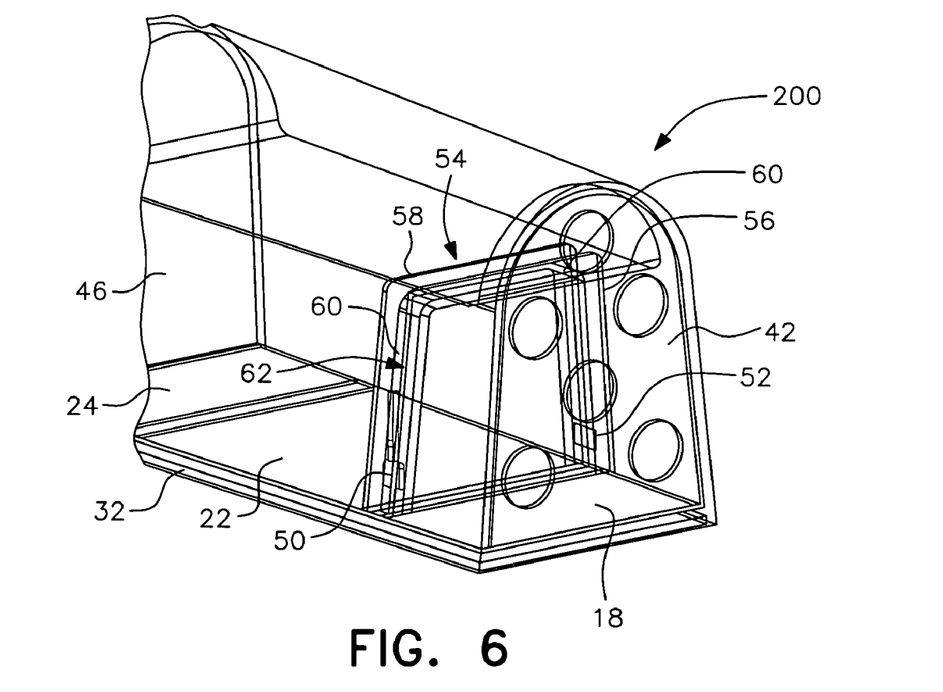
FIG. 6 is a transparent rear perspective view of the animal trap embodiment of FIG. 2.

As shown in FIG. 5, the back wall 42 is provided with openings 48 which allow the smell of the bait to permeate the area around the trap, while also allowing the rodent to sample the bait without entering the trap. This increases the interest of the rodent, providing positive reinforcement so as to overcome their natural tentativeness, particularly in the case of rats, concerning new places. As the confidence of the pest increases, and with the improved visibility into the trap provided by light entering the openings 48, it becomes increasingly likely that the rodent will enter the trap in order to obtain a larger portion of the bait contained therein.

As shown in FIGS. 5 and 6, the IR transmitter 50 and IR receiver 52 of the IR sensor 32 are mounted on or adjacent the side walls 34 so as to face one another across the width of the trap. According to one preferred embodiment, the IR sensor 32 is mounted on a bracket generally designated by the reference numeral 54 which is affixed to or molded integrally with the housing 30. The bracket 54 has an inner frame component 56 and an outer frame component 58 joined by a bridge element 60 that together define a channel, generally designated by the reference numeral 62. The IR transmitter 50 and receiver 52 are secured to the bridge element 60 within the channel 62 so as to be supported and protected on each side by the frame components 56, 58. The bracket is positioned between the first and second killing plates 18, 22 so as to be nearer the back wall 42 than the entrance opening 46. This ensures that the rat is fully within the trap before encountering the IR beam and causing the high voltage pulse train to be initiated.

The IR transmitter is preferably embodied as an IR emitting diode while the IR receiver is preferably embodied as an IR photo transistor such as a 3DU11 pin diode with preamp. According to a preferred embodiment, the IR transmitter 50 emits an IR beam for 50 msec every second. In the absence of a rodent, the IR receiver 52 regularly and repetitively receives the IR beam signals at the rate of emission. If, however, the IR beam signal is blocked so that the IR receiver 52 does not receive the beam signal for a threshold time period, the electrical circuit is activated. According to a preferred embodiment, electrical circuit activation is triggered when the IR receiver 52 does not receive two consecutive IR beam signals, resulting in a threshold time period of about 1.5 seconds. However, shorter or longer thresholds may be established during trap design and manufacture as would be understood by persons of ordinary skill in the art.

Once activated, an electric current is made to flow between the first plate 18 and the second plate 22. The third plate 24 is brought to the voltage level of the first plate 18 through the third electrical connection 17. By effectively activating the entire floor area, the likelihood of rodent escape is reduced, more surely resulting in fatal electrocution of the rodent.

The three-killing-plate and IR sensor configuration of the present invention may be incorporated into other representative embodiments of an electronic trap suitable for use with the circuitry of the present invention, such as the diverter trap which is fully disclosed in the '899 patent and previously incorporated by reference. The IR sensor 32 can also be employed with a two-killing-plate configuration with the plates being of equal or unequal sizes. Regardless of the relative plate sizing in such a two-killing-plate configuration, the IR sensor is positioned between the two plates so as to direct the IR beam signal across the width of the trap.

The operation of the high-voltage, rearming circuitry of the present invention in conjunction with traps of the foregoing types will now be described with reference to FIG. 7, which illustrates a flow chart of the electrical circuit according to the present invention; FIG. 8 illustrates the same circuit in schematic form. The reference in FIG. 7 to a "rat" as the subject pest is representative only and is intended to include all vermin to which the trap according to the present invention may be applied.

To commence operation of the trap, power is applied to the high-voltage output circuit 10, either from a battery or an electrical outlet. The unit is turned on, step 300, by a user using the switch 26, thereby placing the trap into an enabled condition. Upon entry into the enabled condition, the LED 28 flashes green once, step 302, and then turns off. The high-voltage output circuit 10 detects the battery status and, if the battery power is low, step 304, the LED flashes red one or more times, step 306, as a visual indicator to the user that the batteries should be replaced. Upon conclusion of the red LED flashing procedure, and also if the battery power is found to be sufficient in step 304, the unit remains in the enabled condition in a standby mode, step 308.

As an alternative indicator in the event of low battery power, the LED may flash red on a continuing and regular basis. If the trap includes only one LED, then green flashing thereof concurrent with the red flashing will change the output color of the LED to indicate to the user that both conditions are being reported. The red and green colors are provided by diodes of appropriate colors within the circuit.

The circuit 100 is triggered or activated, step 310, by interruption of the IR beam signal for the threshold time period as described above. Once activated, the circuit 10 delivers a high voltage pulse train to the killing plates 18, 22, 24. The high voltage pulses delivered to the killing plates are preferably delivered as a pulse train of at least about 7500V occurring every 4.25 ms over about a 120-second killing cycle, step 312. Upon completion of the killing cycle, current to the plates is terminated, and the battery level is checked, step 314. As before, if the battery power is low, step 314, the LED flashes red one or more times, step 316, as a visual indicator to the user that the batteries should be replaced. Upon conclusion of the red LED flashing procedure, and also if the battery power is found to be sufficient in step 314, the unit checks a stored trigger count, step 318, to determine if the circuit has been activated three times since entering the standby mode at step 308.

If the trigger count is equal to three, flashing of the green LED at a regular interval is initiated, step 320, and the unit does not reenter the enabled condition. Particularly, the LED flashes green once, checks to see whether 24 hours have elapsed, step 322 and, if 24 hours have not elapsed, repeats the flash and check cycle, steps 320 and 322. According to a preferred embodiment, the LED flashes green once every 5 seconds. When 24 hours have elapsed following the initiation of step 320, the unit is turned off, step 324.

If the trigger count is less than three, the IR transmitter 50 resumes emission of the IR beam signals at a preferred rate of about 50 msec every second. If the IR receiver 52 does not receive two consecutive signals, step 326, this indicates the continued presence of the rodent whose body is blocking the beam signal. The unit then initiates the regular flashing and checking cycle, steps 320, 322, to visually notify the user that the trap contains an electrocuted animal. The green flashing of the LED continues until the user services the trap or for a 24 period, step 322, whichever occurs first, after which the unit is turned off.

If, after IR beam signal emission has resumed following the killing cycle, the IR receiver 52 does receive the IR beam signals, step 326, i.e., there is no rodent between the transmitter and the receiver, the unit rearms to the enabled condition in standby mode, step 308, and thereafter awaits another rodent trigger. In this case, the LED does not illuminate, precluding the user from responding to a false-positive condition.

Figure 7:
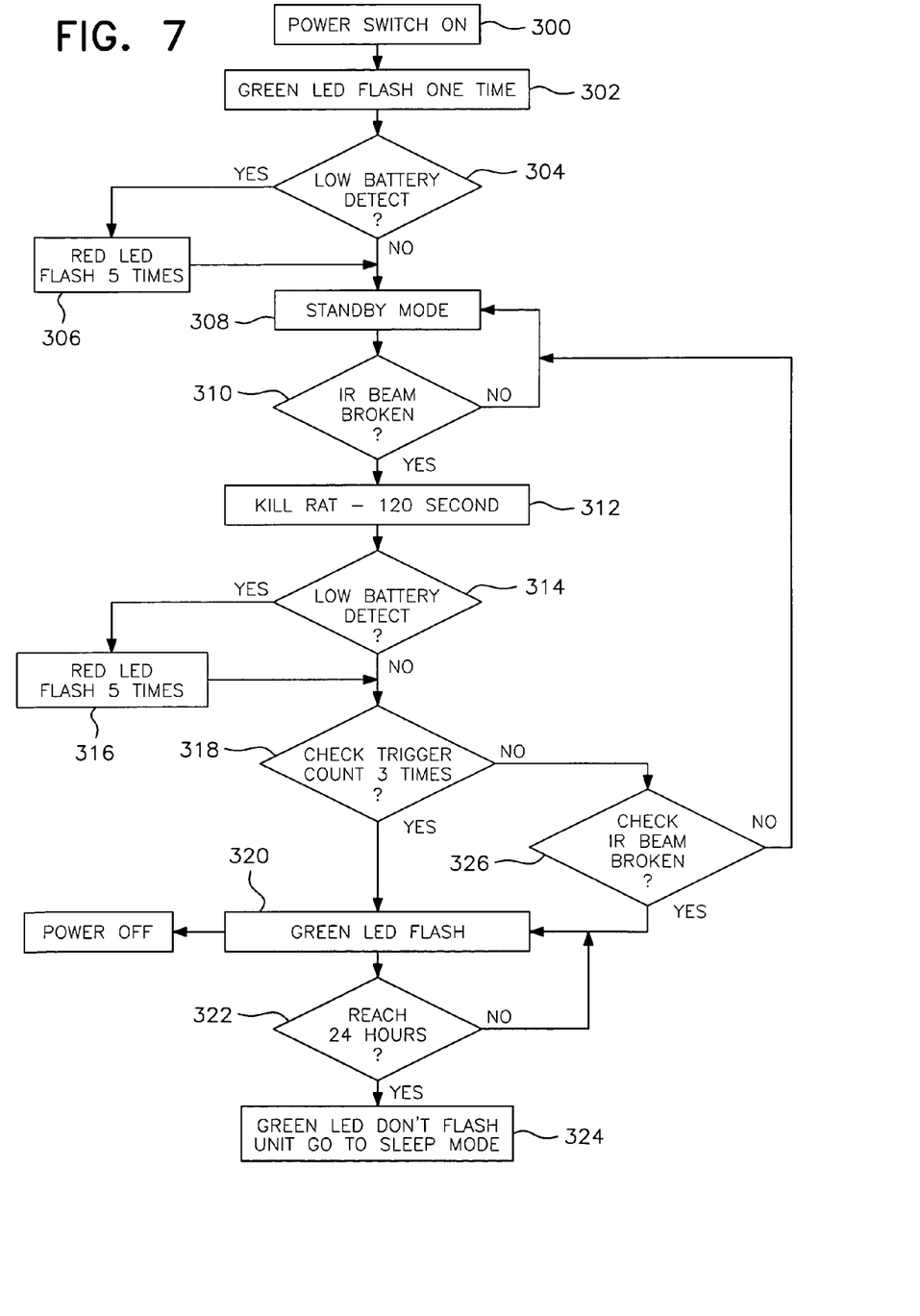
FIG. 7 is a flow chart of a high-voltage rearming electronic circuit according to the present invention.
Figure 8:
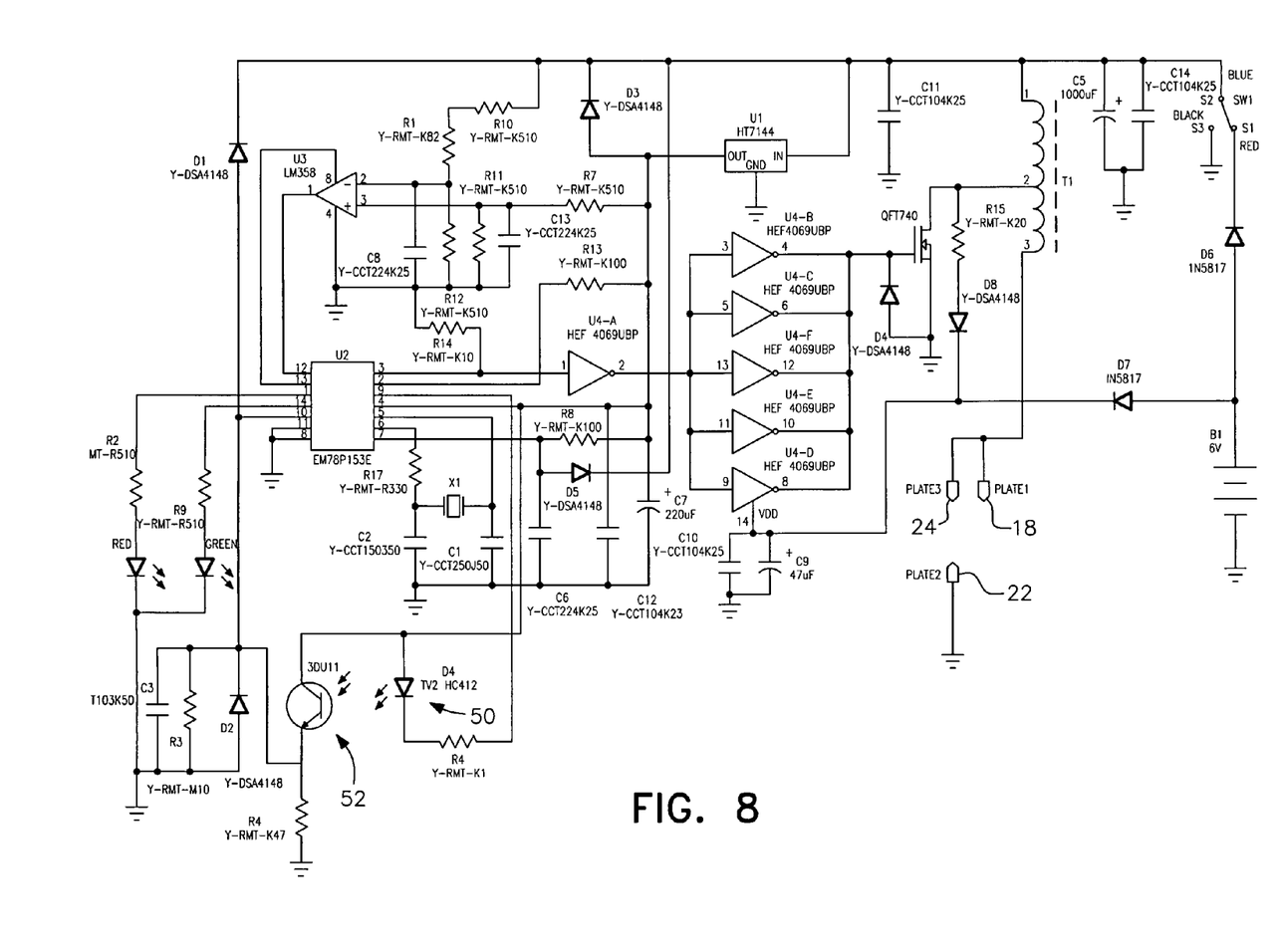
FIG. 8 is a schematic illustration of the high-voltage rearming electronic circuit with IR sensor and three-killing-plate configuration of the present invention.

According to the preferred embodiment as illustrated in FIG. 7, in the event that the presence of the rodent is not detected following the killing cycle, the circuit will rearm itself twice in the manner just described, preferably within five seconds of completing the killing cycle. Once the unit has been triggered three times, step 318, the flashing and rechecking cycle is entered, steps 320, 322, regardless of the status of beam interruption, followed by unit shut-down after 24 hours. As would be apparent to persons of skill in the art, the circuit may be designed to rearm a greater or fewer number of times before turning off, depending upon system and user requirements.

As stated previously, the present invention may be embodied with other sensing elements such as a photocell sensor, a motion sensor, or a reflective sensor, for detecting the presence of a rat in the trap. Photocell sensors are well known and have been used to limit activation of an associated circuit to day or night hours, while motion sensors are widely used to detect intruders in a given area. Reflective sensors have been used reliably in public plumbing fixtures for several years. The emitter and detector are combined in a single package in the reflective sensor which may be embodied as a printed circuit board mounted behind a protective window. A reflective sensor is advantageous as no external wiring is required inside the trap chamber, eliminating the need for the bracket.

The foregoing is considered as illustrative only of the principles of the invention. Since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. An electronic pest trap comprising:
    a trap body having a power source and a switch mechanism for placing said trap into an active standby mode;
    a plurality of spaced killing plates including first and second killing plates positioned within said trap body;
    an interruptible beam sensor including a beam transmitter and a beam receiver configured to transmit and receive, respectively, an interruptible beam signal across a width of said trap between said first and second killing plates; and
    a high-voltage, automatically rearming circuit coupled to said first and second spaced killing plates and to said interruptible beam sensor, said circuit initiating, in response to said sensor detecting a threshold interruption in said beam signal, delivery of a high-voltage pulse train through said circuit to said first and second killing plates for a time period corresponding to a killing cycle, said current flow to said killing plates being terminated by said circuit upon completion of said killing cycle, said automatically rearming circuit being configured, upon completion of a killing cycle, to check a stored trigger count indicating a number of previous killing cycles completed by said circuit to determine whether a sum of said killing cycle and said stored trigger count has reached a threshold value, and to automatically rearm said circuit in response to said sum being less than said threshold value in combination with the input from said interruptible beam sensor indicating no beam signal interruption remains, said circuit further being configured to initiate, in response to said sum being equal to said threshold value or to said sum being less than said threshold value in combination with an indication from said interruptible beam sensor of beam signal interruption, a visual notification mode indicating manual service of said trap is required.

2. The electronic pest trap as set forth in claim 1, wherein said plurality of spaced killing plates includes a third killing plate positioned within said trap body and electrically connected to said first killing plate.

3. The electronic pest trap as set forth in claim 2, wherein said third killing plate is adjacent an entrance to said trap, said first killing plate is located farthest from said entrance within said trap body, and said second killing plate is located intermediate said first and third killing plates.

4. The electronic pest trap as set forth in claim 1, wherein said killing cycle includes delivery of a pulse train of at least about 7500V to said killing plates every 4.25 msec for about 120 seconds.

5. The electronic pest trap as set forth in claim 1, wherein said interruptible beam sensor is an infrared beam sensor having an IR transmitter that transmits an IR beam signal and an IR receiver that receives said IR beam signal.

6. The electronic pest trap as set forth in claim 5, wherein said infrared transmitter emits the IR beam signal for about 50 msec every second.

7. The electronic pest trap as set forth in claim 6, wherein said threshold interruption is reached when said infrared receiver does not receive said IR beam signal for two consecutive transmissions.

8. An electronic pest trap comprising:
   a trap body having a power source and a mechanism for placing said trap into an active standby mode;
   a plurality of killing plates positioned within said trap body;
   an infrared sensor positioned within said trap body and including an infrared transmitter and an infrared receiver configured to transmit and receive, respectively, an infrared (IR) beam signal across a width of said trap, said infrared transmitter emitting the IR beam signal for about 50 msec every second;
   a high-voltage circuit coupled to said killing plates, said circuit, with said trap in said active standby mode, automatically activating in response to said infrared sensor detecting a threshold interruption in said infrared beam signal such that said power source delivers a high-voltage pulse train through said circuit to said killing plates for a time period, said threshold interruption being reached when said infrared receiver does not receive said IR beam signal for two consecutive transmissions, said circuit being configured, after detection of said threshold interruption and delivery of said high-voltage pulse train for said time period, to automatically rearm said trap to said active standby mode in response to said infrared receiver receiving said infrared beam signal without interruption; and
   a timing mechanism for terminating current flow to said killing plates upon completion of said time period.

9. The electronic pest trap as set forth in claim 8, wherein said plurality of killing plates includes two spaced killing plates, said infrared sensor being positioned between said killing plates.

10. The electronic pest trap as set forth in claim 8, wherein said plurality of killing plates includes a first killing plate located farthest from said entrance within said trap body, a third killing plate located adjacent an entrance to said trap, and a second killing plate located intermediate said first and third killing plates.

11. The electronic pest trap as set forth in claim 10, wherein said infrared sensor is positioned between said first and second killing plates.

12. A method for exterminating a pest using an electronic pest trap having a high-voltage circuit electrically coupled to a plurality of killing plates, said method comprising the steps of:
   a) placing the trap into an active standby mode in which an interruptible beam signal is transmitted across a pathway of the trap, said step of placing said trap in active standby mode including transmitting an infrared beam signal for about 50 msec every second from an infrared transmitter on one side of the trap to an infrared receiver on an opposite side of said trap;
   b) automatically activating said high-voltage circuit in response to reaching a threshold interruption of said beam signal, said threshold interruption being reached when said infrared receiver does not receive said infrared beam signal for two consecutive transmissions;
   c) delivering, by said circuit upon said automatic activation, a high-voltage pulse train to said killing plates; and
   d) terminating current flow to said killing plates after a specified time period.

13. The method as set forth in claim 12, wherein said circuit is configured for automatic rearming, said method further comprising, after step d), the step of:
   e) automatically rearming said trap to said active standby mode upon detecting uninterrupted receipt of said beam signal after said specified time period.

* * * * *